May 21, 1957 H. DURALL 2,792,724
CHAIN SAW SHARPENER
Filed Feb. 6, 1956 2 Sheets-Sheet 1

INVENTOR.
Hugh Durall
BY Webster & Webster
ATTYS.

May 21, 1957  H. DURALL  2,792,724

CHAIN SAW SHARPENER

Filed Feb. 6, 1956

INVENTOR.
Hugh Durall
BY Webster & Webster
ATTYS.

United States Patent Office 2,792,724
Patented May 21, 1957

2,792,724

CHAIN SAW SHARPENER

Hugh Durall, Alturas, Calif.

Application February 6, 1956, Serial No. 563,729

5 Claims. (Cl. 76—40)

This invention relates in general to a power driven sharpener for saws.

In particular the invention is directed to, and it is a major object to provide, an electric motor-driven sharpener, especially adapted—but not limited—for use to sharpen the teeth of endless chain saws.

Another important object of the invention is to provide a saw sharpener, as above, which includes a novel clamp for readily attaching the device to the body of a saw, with the saw tooth grinding unit of such device supported by said clamp and properly positioned for use to sharpen the saw teeth each to the desired cutting angle.

An additional object of the invention is to provide a saw sharpener, as in the preceding paragraph, wherein the saw tooth grinding unit includes an electric motor having a grinding wheel secured on the motor shaft; there being a novel mount between the clamp and said grinding unit which adjustably supports the latter for easy manual swinging movement from an initial clearance position to a position in grinding engagement with an adjacent tooth of the saw.

A further object of the invention is to provide a saw sharpener which includes a novel gauge for locating each tooth in the correct positioning for sharpening; such gauge including a quick-releasable tooth engaging stop.

A still further object of the invention is to provide a saw sharpener, wherein the grinding unit is mounted on the clamp for ready interchange between transversely spaced positions; the teeth of the saw—as is conventional—alternating left and right hand, and the grinding unit in one of such positions being disposed to sharpen the right hand teeth and in the other position being disposed to sharpen the left hand teeth.

It is also an object of the invention to provide a saw sharpener which is designed for ease and economy of manufacture, and convenience of attachment and use.

Still another object of the invention is to provide a practical, reliable, and durable chain saw sharpener, and one which will be exceedingly effective for the purpose for which it is designed.

These objects are accomplished by means of such structure and relative arrangement of parts as will fully appear by a perusal of the following specification and claims.

These objects are accomplished by means of such structure and relative arrangement of parts as will fully appear by a perusal of the following specification and claims.

Figure 1:
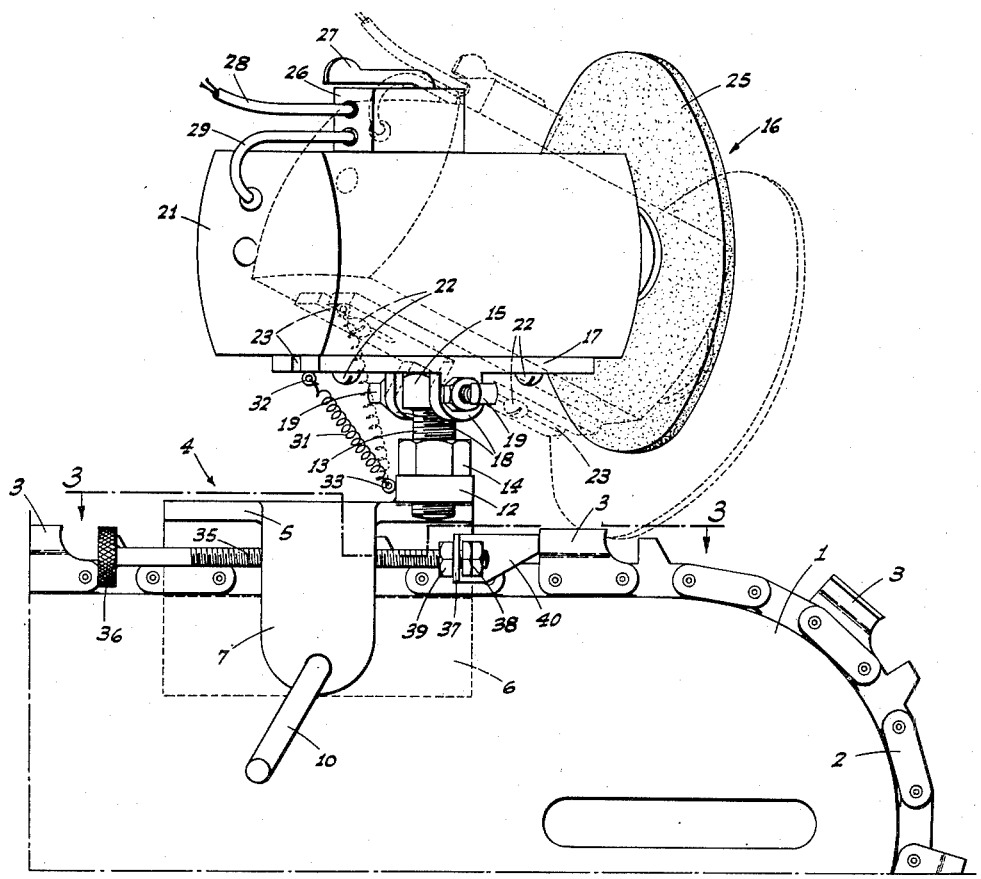
Fig. 1 is a side elevation of the saw sharpener as clamped on an endless chain saw for use; the grinding unit being shown as mounted to sharpen the right hand teeth of the saw. In this view the grinding unit is shown in its initial or starting position in full lines, and in its grinding position in dotted lines.
Figure 4:
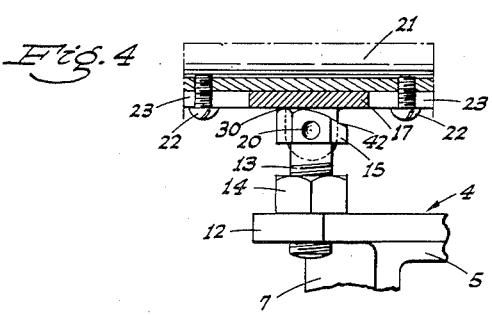
Fig. 4 is a fragmentary elevation, partly in section, showing particularly the adjustable attachment of the electric motor to the screw post supported platform. Additionally, the view shows the details of one screw post head.

Referring now more particularly to the drawings, and to the characters of reference marked thereon, the saw sharpener is here illustrated as used in connection with an endless chain saw, which includes a body or guide plate 1 about the periphery of which the endless chain 2 of the saw travels. The chain 2 carries—at longitudinally spaced points—the cutting teeth, each of which is indicated at 3; the teeth 3—as is conventional—alternating right and left hand.

The saw sharpener includes—and is secured to the saw by—a saddle-like clamp, indicated generally at 4. Such clamp 4 comprises a top cross plate 5, a depending elongated backing plate 6, and a depending front plate 7. Said plates have substantial spacing therebetween, face each other, and the front plate 7 is positioned substantially centrally relative to the ends of the backing plate 6.

When attached to an endless chain saw, the saddle-like clamp 4 straddles an upper portion of the body or guide plate 1 and the adjacent part of the endless chain 2 in clearance relation to the teeth 3.

The clamp 4 is maintained in such position by a transverse clamping screw 8 threaded through the front plate 7, and such screw is fitted—at its inner end—with a swivel head 9 which bears against the adjacent side of the guide plate 1, binding the opposite side against the backing plate 6.

The clamping screw 8, includes, at its outer end, a crank handle 10 for the purpose of actuating said screw. The backing plate 6, on the inner side and adjacent the top, is recessed, as at 11, to provide for saw tooth clearance; i. e., to permit the chain 2 and the teeth 3 to pass through the clamp 4 when the latter is attached to the guide plate 1.

The saddle-like clamp 4 is fitted, on top, with a cross bar 12 whose length is such that it projects some distance at the ends laterally beyond said clamp 4, and at each end thereof such cross bar 12 is fitted with an upstanding screw post 13. The screw posts 13 are adjustably threaded downwardly through the end portions of the cross bar 12, but are normally maintained in a fixed position by lock nuts 14.

Each screw post 13 includes—at its upper end—an integral head 15 which forms a part of a pivotal mount for a grinding wheel unit, indicated generally at 16.

The grinding wheel unit 16, which is adapted to be mounted in connection with one or the other of the screw posts 13, comprises the following:

A normally substantially horizontal platform 17 is formed—on the under side—with integral, transversely spaced, depending ears 18 adapted to receive one or the other of the heads 15 therebetween; there being adjustable opposed trunnion screws 19 threaded through the ears 18 from the outside, and at their inner ends said screws engage in pivotal relation in sockets formed in the sides of the head 15 which lies between said ears. One of such sockets is indicated at 20.

A generally longitudinally extending reversible electric motor 21 rests on the platform 17, and is longitudinally adjustably secured to the latter by screws 22 which pass through longitudinal slots 23 in said platform.

The arbor or shaft 24 of the reversible electric motor 21 projects forwardly, and the projecting end of said shaft is fitted with a circular grinding wheel 25.

The reversible electric motor 21 includes a reversing switch 26 having a control lever 27 thereon; current being supplied to the switch 26 by a cord 28, while the motor or control cord which extends from the switch 26 to the motor 21 is indicated at 29.

When the platform 17 and consequently the electric motor 21 are in their initial or starting position they are—as aforesaid—substantially horizontal, and at such time the under side of said platform abuts the top rear of the head 15 which is disposed between the ears 18; the point of stop abutment being indicated at 30. This prevents the platform 17 and electric motor 21 from swinging downwardly below horizontal at the rear.

The normal horizontal position of the platform 17 and electric motor 21 is yieldably maintained by a tension spring 31 connected between an eye 32 on the rear of said platform 17 and an eye 33 on the related end portion of the cross bar 12. There are two of such eyes 33, one on each end of the cross bar 12, so that the spring 31 can be connected to the corresponding eye 33, dependent on which of the screw posts 13 is supporting the grinding wheel unit 16.

In order to accurately position each tooth 3 below the grinding wheel unit 16, for sharpening, the following adjustable stop or gauge is provided:

On the inside, and adjacent the top, the depending front plate 7 of the clamp 4 is formed with an integral enlarged boss 34 through which an elongated screw 35 is threaded; such screw paralleling the adjacent portion of the chain 2, but lying laterally outwardly thereof.

The screw 35 projects some distance at its ends beyond the boss 34, and at the rear end such screw is formed with a finger knob 36. At its forward end portion the screw 35 passes—relatively freely—through a lateral ear 37 confined but turnable between spaced nuts 38 and 39.

A longitudinal shank 40 extends forwardly from the laterally inner end of the ear 37; such shank also lying outwardly of the chain 2. At its forward end the longitudinal shank 40 is formed with a lateral, inwardly extending stop finger 41 which is adapted to engage the rear of the tooth 3 to be sharpened; thus serving to properly locate such tooth. The position of the stop finger 41 is initially set to the desired tooth locating position by manual adjustment of the screw 35.

Figures 2, 3:
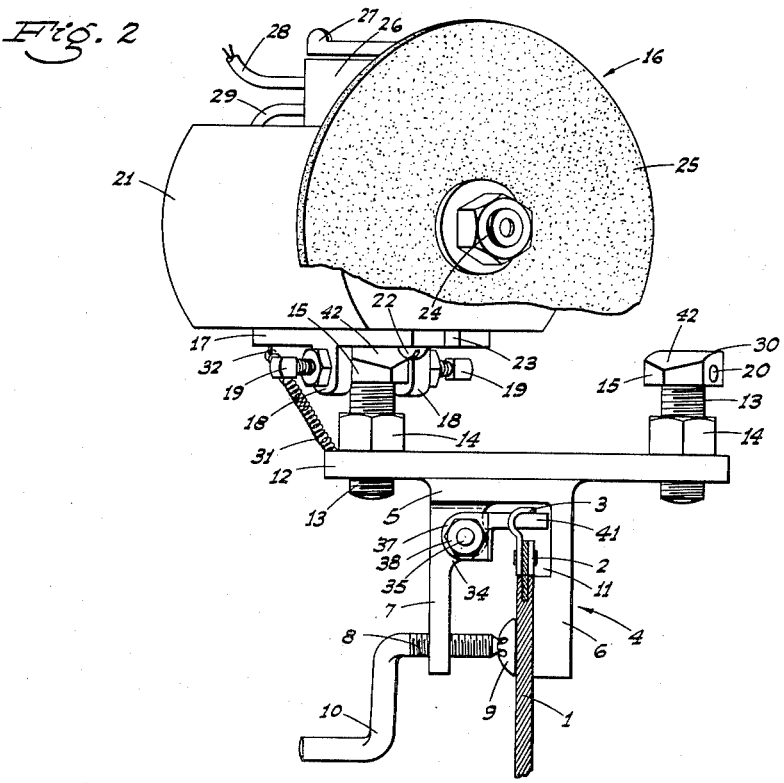
Fig. 2 is a front elevation of the saw sharpener as in Fig. 1; the grinding wheel being partly broken away, and the saw being shown in section.
Fig. 3 is a fragmentary plan view, partly in section, taken on line 3—3 of Fig. 1; the view showing particularly the clamp and the adjustable stop, or gauge.

In use of the described saw sharpener, and with the grinding wheel unit 16 mounted on one of the posts 13 (here the right hand one when looking forwardly from the rear), and after the stop finger 41 has been preset and engaged behind the tooth 3 to be sharpened (see Fig. 3), the electric motor 21 is manually grasped and is swung about its pivotal mount—i. e. the trunnion screws 19—in a direction to cause the grinding wheel 25 to move downwardly and inwardly; such movement being between the full-line and dotted-line positions of Fig. 1. When this occurs the grinding wheel 25 engages and sharpens the tooth which rests against the stop finger 41.

The top of each head 15 is forwardly and downwardly beveled, as at 42, to permit the grinding wheel unit 16 to be swung in the manner described for saw tooth sharpening.

As the teeth 3 are alternate right and left hand, the grinding wheel unit 16 when mounted on said one of the screw posts 13 is used in such position to sharpen only alternate teeth, i. e. the right hand ones. To sharpen the other teeth—i. e. the left hand ones—the grinding wheel unit 16 is transferred to the opposite screw post 13.

As is evident, and for the purpose of accomplishing a sharpening of the teeth at a predetermined cutting angle, the axis of the motor shaft 24 diagonally intersects the longitudinal plane of the chain 2; the angle of intersection being redetermined by setting the rotative position of each of the screw posts 13. Additionally, the extent of the grinding cut on each tooth is controlled by longitudinally adjusting the electric motor 21 on the platform 17 by means of the screws 22.

After each tooth sharpening operation, and when the platform 17 and electric motor 21 are returned to horizontal, the stop finger 41 is lifted clear of the engaged tooth 3, and is then engaged behind the next tooth to be sharpened; the latter being brought into position by suitable movement of the endless chain 2.

With the described saw sharpener, the teeth of an endless chain saw can be sharpened readily and with accuracy; the sharpening of right or left hand teeth requiring only the transfer of the grinding wheel unit 16 from one screw post 13 to the other.

It is to be understood of course that when the right hand teeth are being sharpened, the grinding wheel 25 must turn in one direction, while in an opposite direction of rotation for sharpening the left hand teeth. This is accomplished by reversing the electric motor 21 through the medium of the reversing switch 26.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A sharpener, for a saw having a body and spaced teeth projecting from an edge thereof, comprising a saddle-like clamp adapted to straddle said edge and engage the body with one tooth of the saw located beyond said clamp, a platform above the clamp, a power driven grinding wheel unit supported on the platform, the grinding wheel being disposed beyond the clamp and platform in the direction of said one tooth, transversely spaced posts secured in connection with and upstanding from the clamp laterally outwardly from opposite sides of the body, and means adapted to mount the platform on either post selectively, and for swinging motion of the unit between one position with the grinding wheel clear of said one tooth and another position in sharpening contact therewith; the axis of the grinding wheel extending at a laterally inward diagonal relative to the body and said one tooth when the platform is mounted on either post.

2. A sharpener, for a saw having a body and spaced teeth projecting from an edge thereof, comprising a saddle-like clamp adapted to straddle said edge and engage the body with one tooth of the saw located beyond said clamp, a cross member on the top of the clamp extending laterally of both sides of the body, a post upstanding from each end portion of the cross member in laterally offset relation to the body, a reversible electric motor having a projecting shaft, a grinding wheel on the shaft, and means adapted to mount the motor on either post selectively, with the grinding wheel beyond the clamp in the direction of said one tooth; said means mounting the motor for swinging motion between an initial position with the grinding wheel clear of said one tooth and another position in sharpening contact therewith, and disposing said wheel with its axis extendinng at a laterally inward diagonal when the motor is mounted on either post.

3. A sharpener, for a saw having a body and spaced teeth projecting from an edge thereof, comprising a saddle-like clamp adapted to straddle said edge and engage the body with one tooth of the saw located beyond said clamp, a cross member on the clamp above the body, separate posts upstanding from the cross member in alterally offset relation to opposite sides of the body, an electric motor driven grinding wheel unit above said clamp and posts, a platform on which the unit is secured, and means adapted to mount the platform on either post with the grinding wheel generally above said one tooth, and for swinging movement between an initial position with the grinding wheel clear of said one tooth and another position in sharpening contact therewith, and disposing said wheel with its axis extending at a laterally inward diagonal when the platform is mounted on either post.

4. A saw sharpener, as in claim 3, in which said unit is secured to the platform for adjustment lengthwise of the axis of the grinding wheel.

5. A saw sharpener, as in claim 3, in which each post is secured to the cross member in normally fixed but turnably adjustable relation whereby to alter the diagonal angle of the axis of said wheel.

References Cited in the file of this patent

UNITED STATES PATENTS

| | | |
|---|---|---|
| 1,146,705 | Henry | July 13, 1915 |
| 2,217,145 | Stihl | Oct. 8, 1940 |
| 2,318,456 | Blum | May 4, 1943 |
| 2,490,244 | Wahlstrom | Dec. 6, 1949 |
| 2,501,498 | Collis | Mar. 21, 1950 |
| 2,589,165 | Toy | Mar. 11, 1952 |
| 2,600,850 | Collis | June 17, 1952 |
| 2,643,553 | Evanoff | June 30, 1953 |
| 2,666,346 | Brown | Jan. 19, 1954 |

FOREIGN PATENTS

| | | |
|---|---|---|
| 455,128 | Canada | Mar. 15, 1949 |